United States Patent
Grandidier et al.

(10) Patent No.: US 6,913,642 B2
(45) Date of Patent: Jul. 5, 2005

(54) PIGMENTS HAVING IMPROVED COLORISTIC PROPERTIES AND PROCESS FOR THEIR PREPARATION

(75) Inventors: Yves Grandidier, Rosenau (FR); Albert Riegler, Basel (CH); Klaus Ruf, Bollschwell (DE); Urs Schlatter, Prattlen (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 10/887,493

(22) Filed: Jul. 8, 2004

(65) Prior Publication Data

US 2004/0250732 A1 Dec. 16, 2004

Related U.S. Application Data

(62) Division of application No. 10/309,740, filed on Dec. 4, 2002, which is a division of application No. 09/611,815, filed on Jul. 7, 2000, now Pat. No. 6,517,630.

(30) Foreign Application Priority Data

Jul. 9, 1999 (CH) .............................. 1279/99

(51) Int. Cl.[7] .................. C09B 67/00; C09B 67/48; C09B 47/04; C09B 48/00; C09B 57/00
(52) U.S. Cl. ................. 106/493; 106/410; 106/412; 106/494; 106/495; 106/496; 106/497; 106/498
(58) Field of Search ................. 106/410, 412, 106/493, 494, 495, 496, 497, 498; 534/575; 540/122; 544/63, 339; 546/37, 49, 173; 548/453, 457, 482, 486

(56) References Cited

U.S. PATENT DOCUMENTS

| | | | |
|---|---|---|---|
| 3,598,625 A | 8/1971 | Buckwalter | 106/309 |
| 4,253,839 A | 3/1981 | Spietschka et al. | 8/565 |
| 4,317,908 A | 3/1982 | Sakaguchi et al. | 544/74 |
| 4,481,358 A | 11/1984 | Sakaguchi et al. | 544/99 |
| 4,613,669 A * | 9/1986 | Cassar et al. | 546/167 |
| 4,785,999 A | 11/1988 | Takijiri | 241/26 |
| 4,804,417 A | 2/1989 | Fujita et al. | 106/498 |
| 5,006,173 A | 4/1991 | Fath et al. | 106/410 |
| 5,110,931 A * | 5/1992 | Dietz et al. | 546/37 |
| 5,194,088 A | 3/1993 | Babler et al. | 106/412 |
| 5,281,268 A | 1/1994 | Ide et al. | 106/410 |
| 5,318,627 A | 6/1994 | Dietz et al. | 106/498 |
| 5,368,641 A * | 11/1994 | Dietz et al. | 106/495 |
| 5,389,141 A | 2/1995 | Chassot | 106/498 |
| 5,476,949 A | 12/1995 | Wallquist et al. | 548/453 |
| 5,626,662 A | 5/1997 | Urban | 106/497 |
| 5,776,238 A | 7/1998 | Kerwin et al. | 106/412 |
| 5,800,607 A | 9/1998 | Schnaitmann et al. | 106/412 |
| 6,013,126 A | 1/2000 | Shannon et al. | 106/493 |
| 6,056,814 A | 5/2000 | Kato et al. | 106/412 |
| 6,410,619 B2 | 6/2002 | Greene et al. | 524/88 |

FOREIGN PATENT DOCUMENTS

| | | |
|---|---|---|
| CH | 375464 | 4/1964 |
| DE | 1225598 | 9/1966 |
| DE | 1936312 | 1/1971 |
| EP | 0069895 | 1/1983 |
| EP | 0075182 | 3/1983 |
| FR | 1265455 | 12/1961 |
| GB | 1486022 | 9/1977 |
| GB | 1582159 | 12/1980 |
| JP | 4-320458 | 11/1992 |

OTHER PUBLICATIONS

Abstract for EP 0069895 (Jan./1983).
Chem. Abstr. 66:38934 (1967) of DE 1225598, (Sep. 1966).
Abstract for EP 0075182 (Mar. 1983).
Chem. Abstr. 127:123024 of JP 09165528 (Jun. 1997).
Chemical Abstracts vol. 57:12671h for CH 375464 (Apr. 1964).
Derw. Abst. 1971–02009S [02] of DE 1936312 (Jan. 1971).
Chem. Abstr. 1991:451950 for JP 03009960 (Jan. 1991).
Chemical Abstracts, Registry No. 215247–95–3 (no date recited).

* cited by examiner

*Primary Examiner*—Anthony J. Green
(74) *Attorney, Agent, or Firm*—Tyler A. Stevenson

(57) ABSTRACT

Substantially crystalline organic pigments characterized by small particle size and narrow particle size distribution.

39 Claims, 3 Drawing Sheets

PIGMENTS HAVING IMPROVED COLORISTIC PROPERTIES AND PROCESS FOR THEIR PREPARATION

This application is a divisional of application Ser. No. 10/309,740, filed Dec. 4, 2002, which is a divisional of application Ser. No. 09/611,815, filed Jul. 7, 2000, now U.S. Pat. No. 6,517,630.

The invention relates to a novel pigment form of Pigment Violet 23, having a higher colour strength and higher colour saturation as well as excellent other applications properties. The pigment of the invention is obtained by kneading an amorphized form with an inorganic salt in the presence of an organic liquid and may be used in particular in printing inks. By using the same procedure, it is also possible to improve the applications properties of other pigments, amongst them in particular Pigment Red 254.

Shade, colour strength, gloss and transparency are the most important colouristic properties in printing inks and colour filters. The shade must correspond to very specific values but with maximum possible colour saturation with a view to a broad colour palette in multicolour printing. To this end, the colour strength, gloss and transparency should be as high as possible.

Additionally, pigments should nowadays be able to be used without losses in their applications properties even in modern, environmentally friendly systems, for example in water-based coating compositions or printing inks. These are formulations whose volatile fraction consists of from 5 to 100% by weight, preferably of at least 20% by weight, with particular preference of at least 50% by weight, of water, based on the overall weight of all volatile components.

Figure 1:
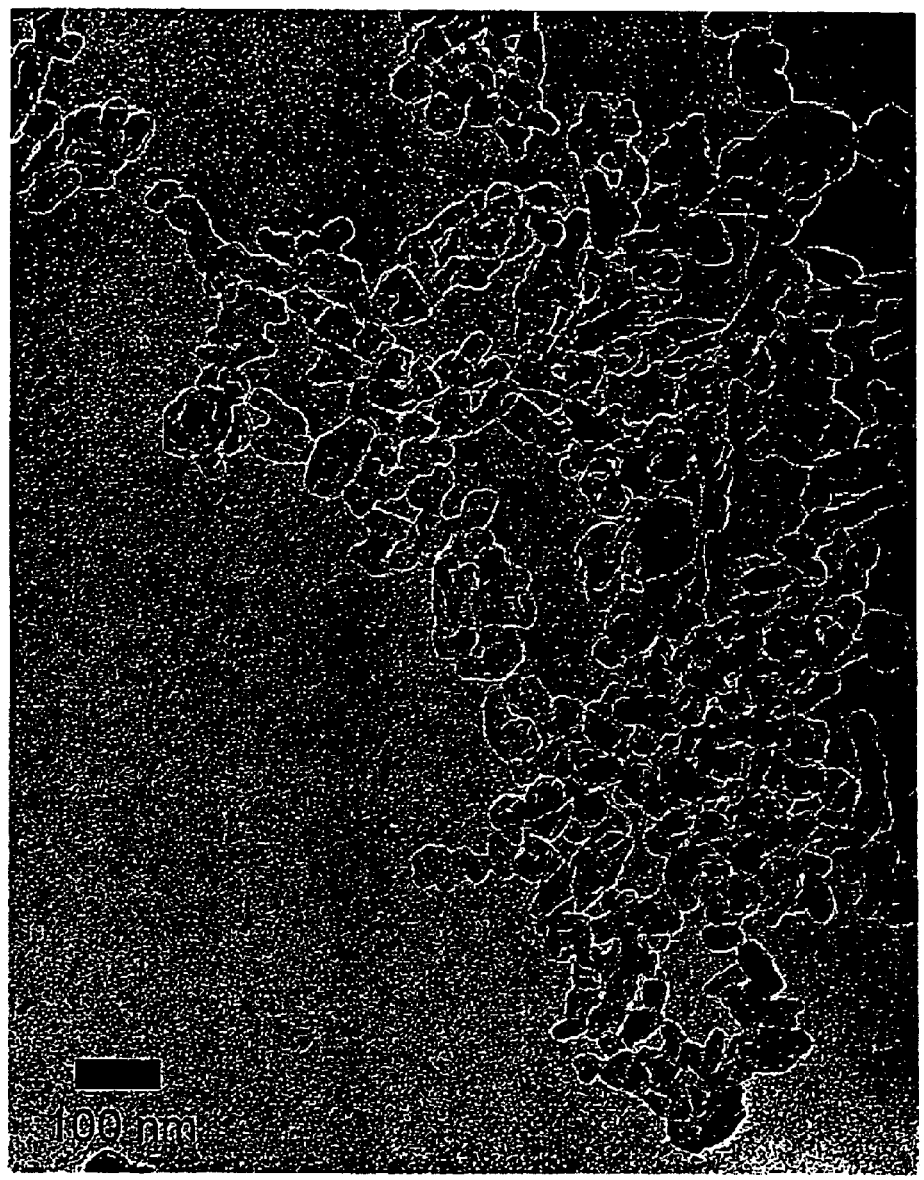
FIG. 1 is a TEM (Transmission Electron Microscopy) picture of the pigment of Example C12.

C.I. Pigment Violet 23 [51319, "Carbazole Violet"] is an important commercial pigment which is available in many grades, for example as Cromophtal® Violet GT (Ciba Spezialitäten-chemie AG), Hostaperm® Violet RL Special (Clariant) or Fastogen® Super Violet RN (Dainippon Ink). However, it has been found that none of the products known to date is capable of giving complete satisfaction, especially as regards colour strength, colour saturation, gloss and transparency in the case of printing ink applications.

C.I. Pigment Red 254 [56110], the first and most important commercial 1,4-diketopyrrolo-[3,4c]-pyrrole pigment, is also available in many different grades such as for example Irgazin® Red BO or Irgaphor® Red B-CF (Ciba Specialty Chemicals Inc.). However, their coloristic properties, especially the hue and transparency, have proven still not to reach perfectly the desired values.

U.S. Pat. No. 5,281,268 discloses a process for the manufacture of β-form copper phthalocyanine, wherein the crude is first dry-milled with an attriter under unknown speed conditions, then wet-milled with a kneader in the presence of an inorganic salt and an organic solvent. This pigment has excellent gloss and clearness in colours inks, coatings and coloured plastic articles.

U.S. Pat. No. 3,598,625 discloses a pigment preparation process, directed primarily also to copper phthalocyanine, in which the crude pigments are first subjected to forces of wear and shear, then treated with micropulverized salt and a solvent in a mixer. In one example, after grinding, Pigment Violet 23 is treated with 9 times the amount of salt and 1.1 times the amount of hexylene glycol. The proportion of hexylene glycol to the crystalline inorganic salt is 1 ml: 7.54 g, that of hexylene glycol to salt plus pigment is 1 ml: 8.38 g.

However, it later became evident, from a variety of sources, that the destruction of the crystallinity in the case of dioxazine pigments is disadvantageous and to be avoided.

Thus U.S. Pat. No. 4,253,839 discloses that coarse-particled dioxazine pigments should be ground in such a way that their crystal structure is essentially retained. Since this grinding process leads to defective surfaces, it absolutely must be supplemented, moreover, by aftertreatment with a solvent, which always takes place in the presence of an acid, a base or a resin.

Better results are obtained in accordance with U.S. Pat. No. 5,800,607 if crude Pigment Violet 23 is ground at high peripheral speed in a nonflocculating liquid medium, especially glycols and their ethers.

U.S. Pat. No. 4,804,417 describes the treatment of crude dioxazine violet with sulfuric acid, followed by treatment in an aqueous medium comprising a dissolved inorganic salt and small amounts of an alcohol, which gives pigments having a very high specific surface area. Crystal growth is not intended to take place.

EP 069 895 discloses the conditioning of crude polycyclic pigments, including Pigment Violet 23, by grinding with sodium sulfate, sodium chloride or aluminium sulfate in the presence of a glycol and an alkaline earth metal halide. This is intended to achieve improved transparency, a cleaner hue and a greater colour strength.

Similar advantages are achieved, however, in accordance with EP 075 182 in the conditioning of an organic pigment by treatment with polyphosphoric acid, Pigment Violet 23 again being mentioned.

According to DE 1 225 598, after dry grinding, dioxazine violet is ground further with aliphatic, araliphatic or aromatic nitro compounds, for example with nitrobenzene. However, there are no inorganic salts present.

U.S. Pat. No. 5,194,088, on the other hand, describes a process for conditioning pigments wherein the crude products are first of all preground, then simply contacted with a highly polar solvent at a temperature below 50° C. Pigment Blue 60 and Pigment Violet 37 produce colour strengths and colour saturations which correspond approximately to those of existing products. Pigment Violet 23 is not mentioned, Pigment Red 254 only as the minor component of a solid solution into Pigment Red 202.

U.S. Pat. No. 4,785,999 describes an analogous process wherein a very specific grinding mechanism is used and the aftertreatment takes place in a very large amount of solvent. Disclosed among many other solvents are ketones, esters and dimethylformamide. Pigment Violet 23 of purportedly excellent colour strength and dispersibility is said to be obtainable in this way if the aftertreatment takes place in a xylene/water emulsion.

U.S. Pat. No. 5,626,662 and JP 09/165,528 disclose processes in which pigments are first dry-ground and then ground in aqueous suspension in a powerful, high-speed ball mill.

EP 780 446 discloses the single-stage conversion of crude dioxazine violet into a strongly coloured, pure pigmentary form by means of salt grinding with 2-ethylcaproic acid.

U.S. Pat. No. 4,317,908 discloses a process for preparing the β crystal form of Pigment Violet 23 in a two-phase mixture of water and an aromatic compound.

U.S. Pat. No. 5,476,949 discloses finely divided highly transparent diketopyrrolopyrrole pigments of high chroma (CIELAB C*) and outstanding transparency. These pigments are obtained directly from the reaction of succinates with nitrites in a molar ratio of 1:2.

All of these extremely diverse methods, however, have still been unable fully to unlock the hitherto unsuspectedly high colouristic potential of pigments such as particularly Pigment Violet 23 and Pigment Red 254.

It has now been found, completely unexpectedly, that a violet pigment having improved colouristic properties and surprisingly higher colour strength may indeed be obtained by grinding amorphized Pigment Violet 23 with an inorganic salt in the presence of an organic liquid if the organic liquid used contains oxo groups and the ratio of Pigment Violet 23 and inorganic salt to the organic liquid, and the temperature, are chosen so as to give a kneadable composition.

A pigment having hitherto unattained colouristic properties is obtained which is ideally suited to all applications, especially for printing inks, preferably for water-based printing inks.

The invention therefore provides a pigment of the formula

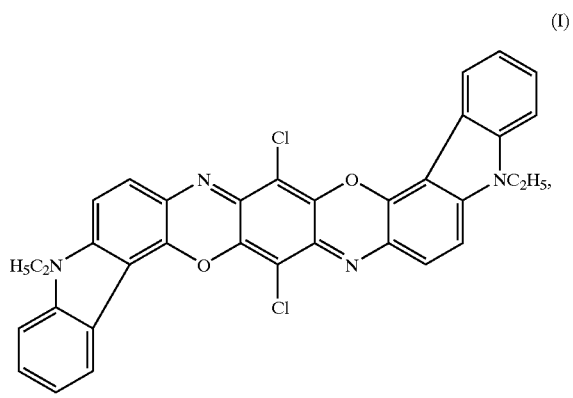

(I)

which, measured in gravure printing with an applied amount after drying of 0.860 g/m², of which pigment of the formula (I) accounts for 0.068 g/m², printed on white kraft paper, gives after drying a lightness L* of not more than 48, a chroma C* of at least 53 and a hue angle h of from 295 to 315, the gravure printing ink being prepared by dispersing 30 parts by weight of pigment and 30 parts by weight of an aqueous solution containing 30% by weight of a dispersing resin dissolved therein and 7% by weight of isopropanol, based in each case on the weight of the solution, first with a laboratory dissolver at 6000 rpm and 23±2° C., for 15 minutes, then in a bead mill with ceramic beads of diameter 1.1±0.1 mm at 6000 rpm and 30±10° C., for 10 minutes, and diluting the resulting dispersion with 900 parts by weight of an aqueous solution containing 18% by weight of a polyacrylate dissolved therein and 15% by weight of isopropanol, based in each case on the weight of the solution, in a laboratory dissolver at 6000 rpm and 23±2° C. for 15 minutes.

The structure (I) was assigned to Pigment Violet 23 in accordance with the Ullmann encyclopaedia.

The lightness L* is preferably not more than 47.5, with particular preference not more than 47, with very particular preference not more than about 46.5. The chroma C* is preferably at least 53.5, with particular preference at least 54. The hue angle h is preferably from 305 to 312, with particular preference from 307 to 310, with very particular preference from 308 to 309.

The lightness L* is situated in general between a minimum value of about 40 and the maximum value specified above, usually between a minimum value of about 44 and the maximum value specified above. The chroma C* is situated in general between the minimum value specified above and a maximum value of about 60, usually between the minimum value specified above and a maximum value of from about 56 to 57.

The colour values are understood as corresponding to the CIE standard 1976 and measured under illumination with standard illuminant D65 and a 10° standard observer, using the visible range from 400 to 700 nm. The white kraft paper itself should be used as the white standard for calibrating the measuring instrument. For examining the colour values, the most suitable paper is a white kraft paper having a nominal weight of from 120 to 150 g/m², in particular approximately 135 g/m², which contains no optical brightener. For example, use may be made of Zanders™ Mega Web 135gr no. 585585 (Sihl & Eika Papier AG, CH-8800 Thalwil, Switzerland).

In case of doubt, the colour values should be determined in accordance with the procedure specified in Example D1 below.

The pigment may be pure or may in addition to the chromophore of the formula (I) contain further components, examples being customary pigment binders or dispersants, which are known to the skilled worker. Additional components are preferably colourless, only weakly coloured, or of the same colour as the chromophore of formula (I), so that they do not substantially influence the colour values of the pigment. If appropriate, in a colour print, further components whose specific absorption coefficient is less than 30% of the specific absorption coefficient of the pigment of the formula (I) at its absorption maximum are taken into account in the overall solids content but not in the pigment content.

It is also possible to surface-modify the pigment of the invention in accordance with one of the many known methods, in order, for example, to increase its dispersibility.

The invention further provides a process for preparing the pigment of the invention, described above, by kneading a composition consisting essentially of a compound of the formula (I), a crystalline inorganic salt or mixture of crystalline inorganic salts and an organic liquid, wherein at the beginning of kneading, the compound of the formula (I) is in substantially amorphous form;

the organic liquid contains at least one oxo group in its molecule; and the proportion of organic liquid to inorganic salt is from 1 ml: 6 g to 3 ml: 7 g, and the proportion of organic liquid to the overall weight of inorganic salt and compound of the formula (I) is from 1 ml: 2.5 g to 1 ml: 7.5 g.

The weight ratio of compound of the formula (I) to crystalline inorganic salt is preferably from 1:4 to 1:12. The temperature is judiciously from −20 to just below the boiling point of the organic liquid, in particular up to about 100° C.

The substantially amorphous nature of the compound of the formula (I) is recognized by the skilled worker in accordance with his or her general knowledge; for example, from the flat X-ray diffraction diagram. If use is made of the X-ray index defined in U.S. Pat. No. 4,253,839, then this index should be judiciously less than 4, preferably less than 2, with particular preference from 0 to 1.5.

A method which has proved particularly effective for efficiently reducing the degree of crystallinity is a novel method in which the crude pigment is subjected, together with an inorganic salt, to very high acceleration. Surprisingly, significantly better results are achieved than in the absence of the inorganic salt or in the case of customary, lower acceleration.

The invention therefore also provides a process for converting a crude pigment into an substantially amorphous fine-particled form, which comprises subjecting a crude pigment and a crystalline inorganic salt or mixture of crystalline inorganic salts together, essentially in the absence of further components, to the action of a rotor having a tangential speed of at least 10 m/s, so that by means of friction effects a temperature of at least 80° C. is reached.

Mixers known as high-speed mixers or heating mixers are known per se to the skilled worker. They comprise a static container with one or more rotors which may be operated at high rotational speeds. The construction of these apparatuses is designed in such a way that all of the material present in the container is continually in motion and each particle comes into recurrent contact with a rotor. The rotors may, for example, have the form of propellers, impellers or serrated wheels and the like. Apparatus of this kind is available, for example, from Diosna, Drais or Henschel, and the latest models achieve tangential speeds of up to about 40 m/s.

Preference is given to the use of a high-speed or heating mixer in which the tangential speed is from 15 to 40 m/s and the ratio of inorganic salt to crude pigment is from 1:1 to 1:12. A tangential speed of at least 30 m/s is particularly efficient. A tangential speed of above 40 up to about 60 m/s is entirely desirable for the practice of the invention but is unfortunately realizable only at great expense in terms of apparatus. A rotational speed of from 20 to 30 m/s is particularly economic, a ratio of inorganic salt to crude pigment used of from 1:4 to 1:8 is particularly preferred.

It has also been found that using relatively larger equipment not only enables a larger throughput, but also gives surprisingly better results. Thus, it is highly preferred to treat from about 10 kg to about 1000 kg of pigment per batch. The use of larger equipments (up to about 10'000 kg) would of course also be preferred, as well as the use of continuously working equipment (provided its design is such that the minimum dwell time of any pigment particle is long enough for the desired result to be obtained). Such apparatuses, however, require high investment costs.

The treatment time depends on the overall amount of substance, the rotational speed, and the cooling. In general, the treatment time is from 1 minute to 72 hours, preferably from 10 minutes to 5 hours, with particular preference from 30 minutes to 2 hours. The temperature rises preferably to 100–200° C., with particular preference to 120–170° C., most preferably from 130 to 160° C.

As soon as new similar devices will appear which allow to get tangential speeds over 40 m/s, we recommend the skilled artisan to test them at all speeds from 30 m/s up to the maximal speed. We expect that these devices will yield at least equivalent and probably even better results, likely in a shorter time.

Further constituents should judiciously be avoided, and impurities minimized. In particular, other than the pigment, there should be essentially no other organic substances, especially no solvents or polymers. The proportion of extraneous organic substances is judiciously not more than 2% by weight, preferably not more than about 5% by weight, based on the crude pigment used.

Suitable inorganic salts are those described later on below. It has been found that surprisingly better results are obtained if a relatively coarse inorganic salt is used, preferably a salt having an average particle size (maximum of the particle size distribution) of from 200 $\mu$m to 1 mm.

The process is particularly suitable for organic pigments of the quinacridone, anthraquinone, perylene, indigo, quinophthalone, indanthrone, isoindolinone, isoindoline, dioxazine, azo, phthalocyanine or diketopyrrolopyrrole series, examples being Colour Index Pigment Yellow 1, Pigment Yellow 3, Pigment Yellow 12, Pigment Yellow 13, Pigment Yellow 14, Pigment Yellow 15, Pigment Yellow 62, Pigment Yellow 73, Pigment Yellow 74, Pigment Yellow 83, Pigment Yellow 93, Pigment Yellow 95, Pigment Yellow 109, Pigment Yellow 110, Pigment Yellow 111, Pigment Yellow 120, Pigment Yellow 128, Pigment Yellow 129, Pigment Yellow 139, Pigment Yellow 147, Pigment Yellow 151, Pigment Yellow 154, Pigment Yellow 168, Pigment Yellow 174, Pigment Yellow 175, Pigment Yellow 180, Pigment Yellow 181, Pigment Yellow 185, Pigment Yellow 188, Pigment Yellow 191:1, Pigment Yellow 194, Pigment Yellow 199, Pigment Orange 5, Pigment Orange 13, Pigment Orange 16, Pigment Orange 22, Pigment Orange 31, Pigment Orange 34, Pigment Orange 48, Pigment Orange 49, Pigment Orange 61, Pigment Orange 64, Pigment Orange 71, Pigment Orange 73, Pigment Red 2, Pigment Red 4, Pigment Red 5, Pigment Red 23, Pigment Red 42, Pigment Red 48:1, Pigment Red 48:2, Pigment Red 48:3, Pigment Red 48:4, Pigment Red 52:2, Pigment Red 53:1, Pigment Red 57:1, Pigment Red 112, Pigment Red 122, Pigment Red 144, Pigment Red 146, Pigment Red 166, Pigment Red 177, Pigment Red 184, Pigment Red 185, Pigment Red 202, Pigment Red 206, Pigment Red 214, Pigment Red 209, Pigment Red 220, Pigment Red 221, Pigment Red 222, Pigment Red 242, Pigment Red 248, Pigment Red 254, Pigment Red 255, Pigment Red 262, Pigment Red 264, Pigment Red 270, Pigment Red 272, Pigment Brown 23, Pigment Brown 25, Pigment Brown 41, Pigment Brown 42, Pigment Green 7, Pigment Green 36, Pigment Blue 15:1, Pigment Blue 15:2, Pigment Blue 15:3, Pigment Blue 15:6, Pigment Blue 16, Pigment. Blue 25, Pigment Blue 26, Pigment Blue 29, Pigment Blue 60, Pigment Blue 64, Pigment Blue 66, Pigment Violet 19, Pigment Violet 23, Pigment Violet 29, Pigment Violet 31, Pigment Violet 32, Pigment Violet 37, 3,6-di(4'-cyanophenyl)-2,5-dihydropyrrolo[3,4-c]-pyrrole-1,4-dione or 3-phenyl-6-(4'-tert-butylphenyl)-2,5-dihydropyrrolo[3,4-c]pyrrole-1,4-dione.

Preferred pigment classes are quinacridones, anthraquinones, isoindolinones, dioxazines, phthalocyanines and diketopyrrolopyrroles, especially dioxazines, phthalocyanines and diketopyrrolopyrroles, most preferred dioxazines and diketopyrrolopyrroles. The most preferred anthraquinones are indanthrones, the most preferred phthalocyanines are copper phthalocyanines, and the most preferred azos are disazo condensation pigments.

Independently from the pigment class, pigments are preferred which contain at least 2 atoms of halogen in their molecule. Preferably, from 1 to 4 of these halogen atoms are bond to phenyl rings, most preferred 1 or 2, especially 1 atom of halogen per chlorinated phenyl group. The maximal amount of halogenated atoms depends on the number of phenyl rings available for substitution, which is for example 8 in Pigment Yellow 110 or 16 in entirely halogenated copper phthalocyanine having 4 phenyl rings. Suitable halogens are fluorine, bromine or chlorine, preferably bromine and chlorine, most preferred chlorine.

It is not known why the instant process leads to such improvements of halogenated and in particular chlorinated pigments. However, we suspect that this may be due to the their unique physical characteristics and crystal lattices, which also lead for example to extremely low solubility and good weather fastness.

Most preferred are pigments having a total of 2 chlorine atoms in their molecule, of which many are listed above, such as in particular Pigment Yellow 95, Pigment Red 202, Pigment Red 254, Pigment Blue 64 and Pigment Violet 23. Some Pigment Green 36 also have just 2 chlorine atoms. Especially preferred are Pigment Red 254 and Pigment Violet 23.

Inorganic pigments may likewise be treated by the same process, examples being Pigment Yellow 53, Pigment Yellow 119, Pigment Yellow 134, Pigment Yellow 164, Pigment Yellow 184, Pigment Red 101, Pigment Red 104, Pigment Brown 24, Pigment Brown 33, Pigment Blue 28, Pigment Blue 36, Pigment Green 17, Pigment Green 26, Pigment Green 50, Pigment Black 12, Pigment Black 27 or Pigment Black 30.

The crude product of the formula (I) is known per se and is also available commercially, for example as "Sumitone® Fast Violet RL 4R base". The processes for preparing the other pigments are all known and generally lead to crude pigments which are highly suitable for amorphization. The initial crystal form is of minor importance in the case of substantially complete amorphization.

In the case of the crude pigment, preference is given to a coarsely particulate form, examples being crystallizates or agglomerates having a length of 0.5 μm or more for 50% by weight of all of the individual particles observable under the optical microscope. The particle size of the substantially amorphous, finely particulate product is preferably below 0.3 μm for 80% by weight of all particles in the product.

The substantially amorphous, fine-particled pigment form prepared in this way may be isolated, and used as a colorant, by customary, known processes. It may also be recrystallized in usual manner in a high boiling, inert polar solvent. However, it has proved particularly advantageous to subject products pretreated in this way, without separating off the inorganic salt, to salt kneading in the presence of a solvent. Completely surprisingly, pigments are obtained in this case which have considerably better properties than by amorphization with subsequent frictionless recrystallization or by kneading alone.

Accordingly, the invention further provides a process for preparing a pigment as disclosed above, which comprises subjecting a crude pigment or mixture of crude pigments and a crystalline inorganic salt or mixture of crystalline inorganic salts together, essentially in the absence of other constituents, to the action of a rotor having a tangential speed of at least 10 m/s, so that a temperature of at least 80° C. is attained by means of friction effects; and subsequently, kneading the product of this treatment with an organic liquid, during which it is possible if desired to add additional substances selected from the group consisting of inorganic salts, inert additives and colorants.

The inorganic salts and organic liquids described later on below, and also mixtures thereof, are suitable. It is not necessary to use in each case the same inorganic salt, or the same grade thereof, for the amorphization and for the kneading. On the contrary, it has surprisingly been found that it is advantageous to use a coarser-particled salt for the amorphization than for the kneading.

In the case of this kneading, it is preferred to employ the abovementioned conditions and proportions of organic liquid to inorganic salt and of organic liquid to the overall weight of inorganic salt and crude pigment.

For the kneading, it is possible if desired to add inert additives known to the skilled worker, examples being binders, fillers, antifoams, dispersants and other additives, in any desired, known amounts, which are dependent on the inert additive and on the target effect and may range from 1 ppm up to the five-fold amount, based on the weight of the crude pigment.

For the purpose of adjusting the shade, it is likewise possible to add any desired known colorants, examples being organic and inorganic white, black and coloured pigments, or water-insoluble dyes, such as disperse dyes.

Additional colorants may in particular also be derivatives of pigments, in particular the oxidized or reduced form thereof such as for example quinacridonequinones or dihydroquinacridones, or also derivatives thereof such as pigments substituted by polar groups and long chains which are well-known as dispersants or rheology improvers.

Additional colorants may likewise be added in any desired amount, these amounts being dependent on the shade to be established and being calculable by the skilled worker using known means, for example colour calculation computer programs.

Additional colorants are added, if desired, judiciously in a ratio of from 1:99 to 99:1, based on the weight of the crude pigment. Preference is given to a ratio of from 1:99 to 50:50. With special preference, however, no additional colorants are used at all, or they are used in amounts below 1:99, for example from 0.01:99.99 to 0.99:99.01, based on the weight of the crude pigment. This leads to pigments having coloristic properties equivalent to those of the pigments, but depending on which additional component is used, their properties such as rheology or dispersibility may be significantly improved.

Exceptionally in the case of the compound of the formula (I), additional colorants are added, if desired, with particular preference in the ratio of from 0:100 to 20:80, with very particular preference from 0:100 to 10:90, based on the weight of the crude pigment.

All additional substances can be added at any desired point in time during kneading, including in particular all of them at the beginning.

If rather than one amorphized organic compound a plurality thereof, for example 2, 3, 4 or 5, are used, then the single components can be amorphized together, or they can also be first amorphized and then blended before kneading. Of course, the finished instant products may also be used as components in further blends with one another, or also with other colorants which may or may not have been treated by any known method as described below.

When mixtures of compounds known to be suitable for the purpose are used—examples being quinacridones and diketopyrrolopyrroles-, then solid solutions or mixed crystals, depending on the pigment classes, identities and proportions of the said compounds, are generally obtained in a particularly efficient and at the same time economic way. But there are surprisingly also some exceptions. Coloristically advantageous mixtures in which the crystal phases coexist in the final product are the object of co-pending application PCT/EP 00/02442; nevertheless, the instant process can also advantageously be used for producing them. In this case, too, the components may be amorphized individually or else all together.

Although it would also be suitable to use more than 5 pigments with absolutely equivalent results, in practice there are no advantages to do so. Preferred mixtures have 2 to 4 components, especially 2 or 3 components, most preferred 2 components.

When mixtures are used, then the amount of each further component can be independently from each other any amount from coloristically effective (often from about 0.001 part by weight, preferably at least 0.01 part by weight, most preferred at least 0.1 part by weight) to 1 part by weight, per part by weight of the first component.

In the kneading process of the invention, the majority of pigment particles are not reduced in size, but in contrast, by virtue of the shear forces between the salt crystals in the presence of the organic liquid, are advantageously converted into an excellently crystalline pigment form. The resultant pigment has superior fastness properties and generally a specific surface area of from 60 to 150 $m^2/g$, preferably from 80 to 140 $m^2/g$, with particular preference from 90 to 120 $m^2/g$. The specific surface area may be determined, for example, using the BET method with nitrogen.

If binders are added, then depending on the amount thereof the specific surface area may fall to about half of the levels mentioned above.

Judiciously, the crystalline inorganic salt is soluble in the organic liquid at $\leq 100$ mg/l at 20° C., preferably $\leq 10$ mg/l at 20° C., and with particular preference is virtually insoluble at 20° C.

The inorganic salt and the organic liquid are preferably each soluble in water to the extent of at least 10 g/100 ml. The inorganic salt used is preferably aluminium sulfate, sodium sulfate, calcium chloride, potassium chloride or sodium chloride, which may if desired contain water of crystallization; particular preference is given to sodium sulfate, potassium chloride or sodium chloride.

For the kneading it is preferred to use a salt having an average particle size of from 5 to 200 µm, with particular preference a salt having an average particle size of from 10 to 50 µm.

As organic liquid it is preferred to use a ketone, an ester, an amide, a sulfone, sulfoxide, a nitro compound, or a mono-, bis- or tris-hydroxy-$C_2$–$C_{12}$alkane compound which is substituted by 1 or 2 oxo groups and on one or more hydroxyl groups may be etherified with $C_1$–$C_8$alkyl or esterified with $C_1$–$C_8$alkylcarbonyl, or a mixture thereof. With particular preference, the ketone, ester, amide, sulfone, sulfoxide or nitro compound is an aliphatic or cycloaliphatic compound.

Judiciously, the organic liquid is neutral per se, although acidic or basic impurities in customary small amounts are not disruptive. Illustrative examples, but in no way limiting to the invention, of neutral organic liquids are triacetin, dimethylformamide, dimethylacetamide, N-methylpyrrolidone, ethyl methyl ketone, cyclohexanone, diacetone alcohol, butyl acetate, nitromethane, dimethyl sulfoxide, and sulfolane. Very particular preference is given to an amide, sulfone or sulfoxide, most preferably an amide, for example dimethyl sulfoxide, sulfolane, N-methylpyrrolidone, dimethylacetamide or, in particular, dimethylformamide.

In the case of pigments from classes other than carbazole violet, it is also possible if desired to use other organic liquids, for example alcohols or glycols, provided that the pigment to be treated in each case is sufficiently soluble therein so that crystal growth takes place under the stated conditions. If this is not the case or not sufficiently the case, then judiciously an abovementioned solvent should be used whose molecule contains at least one oxo group.

The temperature during kneading is preferably from 10 to 60° C. The rotary speed should be established, taking into account the cooling if necessary, in such a way that under uniform shear the kneaded composition is moved homogeneously, and the temperature does not rise above the temperature range according to the invention. Instances of local overheating or mechanical overloading should be avoided as far as possible. Outstanding results are obtained, for example, in a kneader of 5 l capacity at rotary speeds of from 50 to 150 rpm and kneading times of from 6 to 24 h, these figures being by no means limiting and it being possible for the rotary speeds to be lower in larger apparatuses, for example.

Preferably, after kneading, the inorganic salt and the organic liquid are washed with water, especially demineralized water. Drying is conducted preferably at from −20 to 250° C./$10^{-1}$ to $10^5$ Pa, with particular preference from 25 to 100° C./$10^2$ to $10^5$ Pa or from 100 to 200° C./$10^4$ to $10^5$ Pa, with very particular preference around 80° C./$10^4$ Pa.

The pigments obtained in accordance with the invention are notable in particular for high colour saturation and an astoundingly high colour strength. They have very attractive shades with excellent fastness properties, good transparency and good gloss.

The pigment of the invention may be isolated and dried in pure form, in which case it is readily dispersible thereafter in plastics, paints and printing inks using, for example, a ball mill or bead mill. As a moist presscake, it can also be used directly to prepare pigment dispersions.

Dispersions of the pigments of the invention are ideally suited in particular as concentrates for preparing printing inks which have excellent applications properties, especially attractive colouristics with high colour strength.

The invention therefore additionally provides a printing ink for a printing ink concentrate comprising a pigment of the invention.

If desired, in order to improve the applications properties, customary additives such as binders may be added to the pigment of the invention prior to or during its isolation. Since the presence of additives, owing to incompatibilities, frequently results in a restriction of the possible fields of application, it is preferred to refrain from adding them. A very particular advantage which has been found is that pigment isolated without additives is outstandingly compatible with both aqueous and nonaqueous media, so that surprisingly good applications results can be obtained in both cases.

A printing ink is a liquid or pastelike dispersion which comprises colorants, binders and, if desired, solvents and additives. In a liquid printing ink, the binder and, if present, the additives are normally in solution in the solvent. Customary viscosities in the Brookfield viscometer are from 0.1 to 20 Pa·s (No. 4 spindle, 10 rpm). Printing ink concentrates are compositions from which printing inks can be obtained by dilution. Ingredients and compositions of printing inks and printing ink concentrates are familiar to the skilled worker.

In addition to the pigments of the invention, the pigment formulations or pigment dispersions of the invention may include further colorants as described in connection with the kneading.

The printing ink concentrates of the invention contain the pigments of the invention judiciously in a concentration of from 1 to 75% by weight, preferably from 5 to 50% by weight, with particular preference from 25 to 40% by weight, based on the overall weight of the printing ink concentrate.

The invention therefore likewise provides a printing ink concentrate comprising from 1 to 75% by weight, preferably from 5 to 50% by weight, with particular preference from 25 to 40% by weight, based on the overall weight of the printing ink concentrate, of a pigment of the invention which is in dispersion in a binder solution.

The printing inks of the invention contain the pigments of the invention judiciously in a concentration of from 0.01 to 40% by weight, preferably from 1 to 25% by weight, with particular preference from 5 to 10% by weight, based on the overall weight of the printing ink, and may be used, for example, for gravure printing, flexographic printing, screen printing, offset printing, or continuous or dropwise inkjet printing on paper, board, metal, wood, leather, plastic or textiles, or else in special applications in accordance with formulations which are general knowledge, for example in publishing, packaging or freight, in logistics, in advertising, in security printing or else in the office sector for ballpoint pens, felt-tip pens, fibre-tip pens, inking pads, ink ribbons or inkjet printer cartridges.

The invention therefore likewise provides a printing ink comprising from 0.01 to 40% by weight, preferably from 1 to 25% by weight, with particular preference from 5 to 10% by weight, based on the overall weight of the printing ink, of a pigment of the invention which is in dispersion in a binder solution.

Preference is given to printing ink concentrates and printing inks on an aqueous acrylate basis. This is a reference to polymers or copolymers obtained by addition polymerization of at least one monomer containing a group

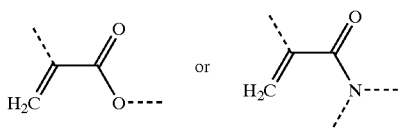

which are in solution in water or a water-containing organic solvent. Suitable organic solvents are water-miscible solvents commonly used by the skilled worker, examples being alcohols, such as methanol, ethanol or an isomer of propanol, butanol or pentanol, ethylene glycol or its ethers, such as ethylene glycol methyl ether or ethylene glycol ethyl ether, or ketones, such as acetone, ethyl methyl ketone or cyclohexanone. Preference is given to water and alcohols.

The invention therefore also provides a printing ink concentrate or printing ink of the invention wherein the binder primarily comprises an acrylate polymer or copolymer and the solvent is selected from the group consisting of water, $C_1$–$C_5$alcohols, ethylene glycol, 2-($C_1$–$C_5$alkoxy) ethanol, acetone, ethyl methyl ketone and any mixtures thereof.

In addition to the binder, the printing ink concentrates and printing inks of the invention may, if desired, also include additives known to the skilled worker, in customary concentrations.

For gravure or flexographic printing it is usual to dilute a printing ink concentrate in order to prepare a printing ink which may then be used in accordance with methods known per se. Concentrates comprising the pigment compositions of the invention are particularly suitable in this case.

The pigments of the invention are further also suitable for preparing solid toners, wax transfer ribbons or very especially colour filters.

Thus, another object of the invention are also the organic pigments obtained by the instant process and their use in colour filters. Their coloristic value is surprisingly high due to a narrow absorption band with unprecedented steep slope, and at the same time they possess an excellent crystallinity combined with a small particle size and a particularly narrow particle size distribution. Advantageously, both big and extremely fine particles are lacking almost completely. The products exhibit both an excellent rheology making possible a high concentration in use and also superior coloristic properties and excellent fastnesses, including outstanding light fastness.

Hence, the invention also relates to a substantially crystalline organic pigment of the quinacridone, anthraquinone, perylene, indigo, quinophthalone, indanthrone, isoindolinone, isoindoline, dioxazine, azo, phthalocyanine or diketopyrrolopyrrole series consisting of particles of average size from 0.01 μm to 0.12 μm, preferably from 0.02 μm to 0.10 μm, most preferred from 0.03 μm to 0.06 μm, characterized in that the total quantity of particles of size greater than 0.12 μm and smaller than 0.01 μm is from 0 to 8% by weight, preferably from 0 to 4% by weight, most preferred from 0 to 2% by weight, based on the weight of particles of size from 0.01 μm to 0.1 μm, and the full width at half maximum (FWHM) of the highest resolved peaks on a $CuK_\alpha$ radiation X-ray powder diagram is from about 0 to 0.68 °2θ, preferably from 0.1 to 0.6 °2θ, most preferred from 0.2 to 0.5 °2θ, with particular reference to about 0.425 °2θ.

In general, measuring solely the highest intensity resolved peak should be deemed appropriate. The minimum peak width depends on the instrument's resolution and can be determined by the Debye-Scherrer formula. For determining the full width at half maximum, it is only suitable to use an instrument the resolution of which is high enough in order not to influence significantly the peak width to be measured.

The invention also pertains to the use of the instant pigments in colour filters, which can themselves be used for example in electro-optical systems such as TV screens, liquid crystal displays, charge coupled devices, plasma displays or electroluminescent displays and the like. These may be, for example, active (twisted nematic) or passive (supertwisted nematic) ferroelectric displays or light-emitting diodes.

The pigments will generally be used in the manufacture of colour filters as a dispersion in an organic solvent or water. There are several ways to manufacture these colour filters, which follow two mainstreams:
 Direct patterning during applying;
 Patterning after applying the pigment.

Direct patterning can be obtained by several printing techniques, such as impact (off-set, flexography, stamping, letterpress etc.) as well as non-impact (ink jet techniques).

Other direct patterning techniques are based on lamination processes, electronic discharging processes like electrodeposition and some special colour proofing methods, like the so-called Chromalin™ process (DuPont).

For impact printing techniques, the pigment may be dispersed in water or organic solvents by standard de-agglomeration methods (Skandex, Dynamill, Dispermat and the like) in the presence of a dispersant and a polymeric binder to produce an ink. Any dispersion technique known in the fiels, including the choice of solvent, dispersant and binder, can be used. The type of ink and its viscosity depend on the application technique and are well-known to the skilled artisan. Most usual binders, to which the invention is of course not limited, are (meth)acrylates, epoxies, PVA, polyimids, Novolak systems and the like as well as combinations of these polymers.

The ink dispersion then can be printed on all kind of standard printing machines. Curing of the binder system is preferably achieved by a heating process. The three colours can be applied at once or in different printing steps with intermediate drying and/or curing steps, for example one colour at the time in three printing steps.

Inks for use in ink jet, for example piezo or bubble jet, can be prepared likewise. They generally contain a pigment dispersed in water and/or one or a mixture of many hydrophilic organic solvents in combination with a dispersant and a binder.

For ink jet printing a standard ink jet printer can be used or a dedicated printer can be built in order to optimize for example the printing speed etc.

For lamination techniques, like thermal transfer and the like, a web system has to be made: The pigment is dispersed in a solvent or water with dispersant and binder and coated on a foil and dried. The pigment/binder system can be patternwise or uniformly transferred to a colour filter substrate with the help of energy (UV, IR, heat, pressure etc.). Depending on the technique used, the colourant for example may be transferred alone (dye diffusion or sublimation transfer), or the colourant dispersion may be entirely transferred including the binder (wax transfer).

For electrodeposition, the pigment has to be dispersed in water together with an ionized polymer. By means of an electrical current, the ionized polymer is deionized at the anode or the cathode and, being insoluble then, deposited together with the pigments. This can be done on patterned or patternwise shielded, by a photoresist, (transparent) photoconductors like ITO etc.

The Chromalin™ process makes use of a photosensitive material, deposited on a colour filter substrate. The material becomes tacky upon UV exposure. The so called 'toner', comprising a mixture or compound of pigment and polymer, is distributed on the substrate and sticks on the tacky parts. This process has to be done three to four times for R,G,B and eventually black.

Patterning after applying is a method based mostly on the known photoresist technology, wherein the pigment is dispersed in the photoresist composition. Other methods are indirect patterning with the help of a separate photoresist or lamination techniques.

The pigment may be dispersed into photoresists by any standard method such as described above for the printing processes. The binder systems may also be identical. Further suitable compositions are described for example in EP 654711, WO 98/45756 or WO 98/45757.

Photoresists comprise a photoinitiator and a poly-crosslinkable monomer (negative radical polymerization), a material to crosslink the polymers itself (for example a photoacid generator or the like) or a material to chemically change the solubility of the polymer in certain developing media. This process, however, can also be done with heat (for example using thermal arrays or an NIR beam) instead of UV, in the case of some polymers which undergo chemical changes during heating processes, resulting in changes of solubility in the mentioned developing media. A photoinitiator is then not needed.

The photosensitive or heat sensible material is coated on a colour filter substrate, dried and UV (or heat) irradiated, sometimes again baked (photoacid generators) and developed with a developing medium (mostly a base). In this last step only the non-exposed (negative systems) or only the exposed (positive systems) parts are washed away, giving the wanted pattern. This operation has to be repeated for all the colours used.

Photosensitive lamination techniques are using the same principle, the only difference being the coating technique. A photosensitive system is applied as described above, however on a web instead of a colour filter substrate. The foil is placed on the colour filter substrate and the photosensitive layer is transferred with the help of heat and/or pressure.

Indirect processes, with the above mentioned polymeric binders without a photosensitive component, make use of an extra photoresist, coated on top of the pigmented resist. During the patterning of the photoresist, the pigmented resist is patterned as well. The photoresist has to be removed afterwards.

More details about the manufacture of colour filters can be found in text books, reviews and other scientific articles. The skilled artisan will associate the instant invention with the use of any such known technique as well.

The colour filters of the invention contain the pigments of the invention judiciously in a concentration of from 1 to 75% by weight, preferably from 5 to 50% by weight, with particular preference from 25 to 40% by weight, based on the overall weight of the pigmented layer.

The invention therefore likewise provides a colour filter comprising a transparent substrate and a layer comprising from 1 to 75% by weight, preferably from 5 to 50% by weight, with particular preference from 25 to 40% by weight, based on the overall weight of the layer, of a pigment of the invention dispersed in a high molecular mass organic material. The substrate is preferably essentially colourless (T≧95% all over the visible range from 400 to 700 nm).

The binder may be any high molecular mass organic material as defined below, binder materials as described above being only examples.

The instant printing inks or photoresists for making colour filters contain the pigments of the invention judiciously in a concentration of from 0.01 to 40% by weight, preferably from 1 to 25% by weight, with particular preference from 5 to 10% by weight, based on the overall weight of the printing ink or photoresist.

The invention therefore likewise provides a composition for making colour filters comprising from 0.01 to 40% by weight, preferably from 1 to 25% by weight, with particular preference from 5 to 10% by weight, based on the overall weight of the composition, of a pigment of the invention dispersed therein.

Figure 4:
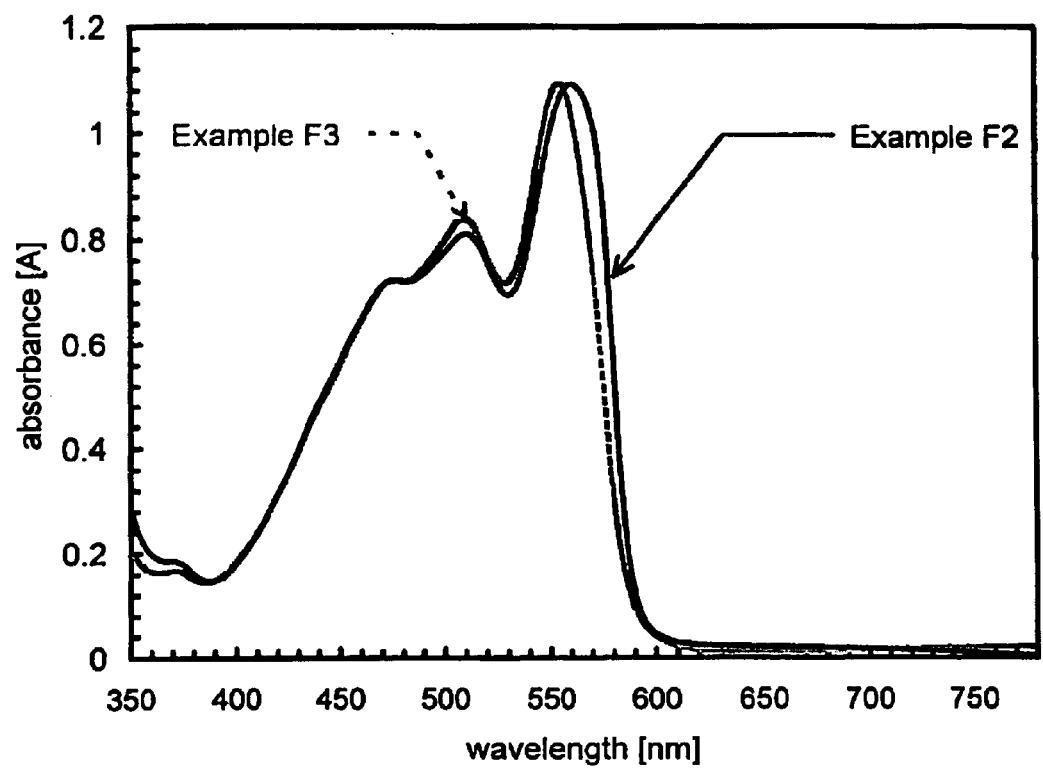
FIG. 4 shows the absorption spectrum of Pigment Red 254 when micronized by the process of the instant invention, F2, dispersed in a polymer film, compared to the absorption spectrum of Pigment Red 254 prepared according to Example 1 of U.S. Pat. No. 4,931,566, F3, dispersed in a polymer film.

The preferences relative to pigments for use in colour filters follow the same lines as indicated above. A very particularly preferred pigment for use in colour filters is Pigment Red 254. When micronized by the instant process, Pigment Red 254 shows a hitherto never seen absorption spectrum when dispersed in a polymer film. The absorption maximum at about 552 nm is shifted to about 560 nm and the slope down to 590 nm is much steeper (FIG. 4). This is highly advantageous as it enables a desired, substantially higher absorption of green light (emission wavelength about 585 nm).

Thus, the invention also pertains to a pigment of the formula

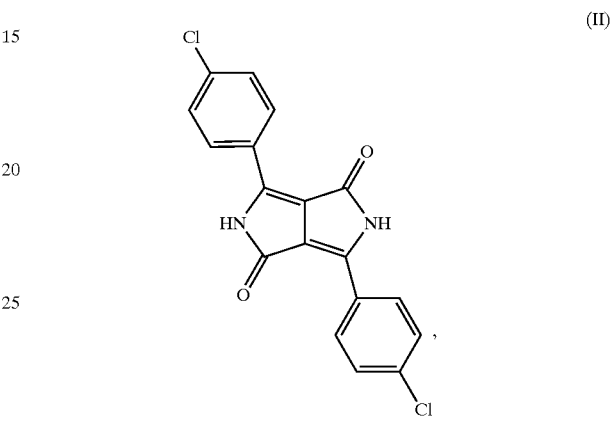

(II)

characterized in that a 50% by weight dispersion thereof in a methacrylic resin, applied as a film of thickness such that the absorption maximum in the area from 400 to 700 nm has an intensity of 1.0±0.1, said absorption maximum occurs at a wavelength from 556 to 596 nm, preferably from 557 to 565 nm. The maximum slope (at the inversion point) on the bathochromic side of the absorption maximum reaches preferably at least 5% change in absorption per 1 nm change in wavelength, based on the absorption at the absorption maximum, most preferably at least 5.5% A/1 nm.

This pigment also may additionally contain other colorants of structure different from (II), for example such as disclosed above. When such colorants are added, then of course the absorption maximum is shifted. Most suitable additional colorants are other 1,4-diketopyrrolo[3,4c]-pyrrole pigments, preferably Pigment Orange 71, Pigment Orange 73, Pigment Red 255, Pigment Red 264, Pigment Red 270, Pigment Red 272, 3,6-di(4'-cyanophenyl)-2,5-dihydropyrrolo[3,4-c]pyrrole-1,4-dione or 3-phenyl-6-(4'-tert-butylphenyl)-2,5-dihydropyrrolo[3,4-c]pyrrole-1,4-dione. The additional components will shift the mixture's spectrum hypsochromically or bathochromically depending on their own hue or on the eventual formation of solid solutions or mixed crystals. Though the absorption maximum is shifted, however, the slope is still advantageously steep.

Thus, the application also pertains to a 1,4-diketopyrrolo[3,4c]-pyrrole pigment, characterized in that a 50% by weight dispersion thereof in a methacrylic resin, applied as a film of thickness such that the absorption maximum in the area from 400 to 700 nm has an intensity of 1.0±0.1, the maximum slope on the bathochromic side of the absorption maximum in the range from 500 to 650 nm reaches at least 5% change in absorption per 1 nm change in wavelength, based on the absorption at said absorption maximum.

Suitably, the methacrylic resin is substantially colourless, examples thereof which are known to the skilled artisan being copolymers of aromatic methacrylates with methacrylic acid of $M_w$ from 30'000 to 60'000. The film is most appropriately made by spin-coating.

The pigments of the invention are finally also suitable for colouring high molecular mass organic materials in the mass.

The high molecular mass organic material to be coloured in accordance with the invention may be natural or synthetic in origin and normally has a molecular weight in the range from $10^3$ to $10^8$ g/mol. The said material may, for example, comprise natural resins or drying oils, rubber or casein, or modified natural substances, such as chlorinated rubber, oil-modified alkyd resins, viscose, cellulose ethers or esters, such as cellulose acetate, cellulose propionate, cellulose acetobutyrate or nitrocellulose, but especially fully synthetic organic polymers (both thermosets and thermoplastics), as obtained by addition polymerization, polycondensation or polyaddition, examples being polyolefins such as polyethylene, polypropylene or polyisobutylene, substituted polyolefins such as polymers of vinyl chloride, vinyl acetate, styrene, acrylonitrile or acrylates and/or methacrylates or butadiene, and also copolymers of the abovementioned monomers, especially ABS or EVA.

From the series of the polyaddition resins and polycondensation resins, mention may be made of the condensates of formaldehyde with phenols, known as phenolic resins, and the condensates of formaldehyde with urea, thiourea and melamine, known as amino resins, the polyesters used as paint resins, and indeed both saturated resins, such as alkyd resins, and unsaturated resins, such as maleate resins, and also the linear polyesters and polyamides, or silicones.

The high molecular mass compounds mentioned may be present individually or in mixtures, as plastic masses or melts, which may if desired be spun into fibres.

They may also be present in the form of their monomers or in the polymerized state in dissolved form as film formers or binders for coating materials or printing inks, such as linseed oil varnish, nitrocellulose, alkyd resins, melamine resins, urea-formaldehyde resins or acrylic resins. When used in coatings, the instant pigments exhibit higher fastnesses than the chemically identical pigments of similar mean particle size or of similar surface area. However, their use in coatings is relatively limited due to their high transparency (for example in metallic finishes).

Pigmentation of the high molecular mass organic substances with the pigments of the invention takes place, for example, by mixing such a pigment, in the form if desired of masterbatches, into these substrates using roll mills, mixers or milling apparatus. In general, the pigmented material is subsequently brought into the desired ultimate form by techniques known per se such as calendering, compression moulding, extrusion, spreading, casting or injection moulding. In order to produce nonrigid mouldings or to reduce their brittleness it is often desirable to incorporate what are known as plasticizers into the high molecular mass compounds prior to their shaping. Examples of such plasticizers which may be used are esters of phosphoric acid, phthalic acid or sebacic acid. In the process of the invention, the plasticizers may be incorporated before or after the incorporation of the pigmentary colorant into the polymers. A further possibility, in order to obtain different hues, is to add fillers and/or other colouring constituents such as white, coloured or black pigments, and also effect pigments, in the particular desired amount to the high molecular mass organic materials in addition to the pigment compositions.

For pigmenting coating materials and printing inks, the high molecular mass organic materials and the pigments of the invention, alone or together with additives such as fillers, other pigments, siccatives or plasticizers, are finely dispersed or dissolved in, generally, an organic and/or aqueous solvent or solvent mixture. One possible procedure here is to disperse or dissolve the individual components alone, or else two or more together, and only then to combine all of the components.

A further embodiment therefore additionally provides mass-coloured high molecular mass organic material comprising (a) from 0.05 to 70% by weight, based on the sum of (a) and (b), of a pigment of the invention, and (b) from 99.95 to 30% by weight, based on the sum of (a) and (b), of a high molecular mass organic material.

Said material comprises both a ready-to-use composition or an article formed therefrom, and a masterbatch, in the form of granules, for example. If desired, the high molecular mass organic material coloured in accordance with the invention may also comprise customary additives, for example stabilizers.

A further embodiment therefore additionally provides a process for colouring high molecular mass organic material in the mass, which comprises incorporating therein a pigment of the invention, for example by mixing the high molecular mass organic material with the pigment composition of the invention, optionally in the form of a masterbatch, in a manner known per se and processing this mixture.

The examples which follow illustrate the invention without restricting its scope (unless specified otherwise, "%" always relates to % by weight):

EXAMPLE A1

Commercial, crude carbazole violet is ground in accordance with DE-1 225 598 until the X-ray powder diagram ($CuK_\alpha$) no longer shows any significant signals.

EXAMPLE A2

The procedure of Example A1 is repeated but using the grinding method of Example 8 of U.S. Pat. No. 4,785,999 until the X-ray powder diagram no longer shows any significant signals.

EXAMPLE A3

The procedure of Example A1 is repeated but using the grinding method of Example 1 of U.S. Pat. No. 5,194,088 and extending the grinding duration until the X-ray powder diagram no longer shows any significant signals.

EXAMPLE A4

The procedure of Example A1 is repeated but using the ball mill method of the first part of Example III of U.S. Pat. No. 3,598,625 until the X-ray powder diagram no longer shows any significant signals.

EXAMPLE A5

The procedure of Example A1 is repeated but using as starting material the crude product from page 75 of the BIOS final report 960, containing 25% salt from the synthesis.

EXAMPLE A6

The procedure of Example A2 is repeated but using as starting material the crude product from page 75 of the BIOS final report 960, containing 25% salt from the synthesis.

EXAMPLE A7

The procedure of Example A3 is repeated but using as starting material the crude product from page 75 of the BIOS final report 960, containing 25% salt from the synthesis.

EXAMPLE A8

The procedure of Example A4 is repeated but using as starting material the crude product from page 75 of the BIOS final report 960, containing 25% salt from the synthesis.

EXAMPLE A9

The procedure of Example A1 is repeated but using as starting material the α product of JP-39/16786.

EXAMPLE A10

The procedure of Example A2 is repeated but using as starting material the α product of JP-39/16786.

EXAMPLE A11

The procedure of Example A3 is repeated but using as starting material the α product of JP-39/16786.

EXAMPLE A12

The procedure of Example A4 is repeated but using as starting material the α product of JP-39/16786.

EXAMPLE A13

The procedure of Example A1 is repeated but using as starting material the α product of JP-52/935.

EXAMPLE A14

The procedure of Example A2 is repeated but using as starting material the α product of JP-52/935.

EXAMPLE A15

The procedure of Example A3 is repeated but using as starting material the α product of JP-52/935.

EXAMPLE A16

The procedure of Example A4 is repeated but using as starting material the α product of JP-52/935.

EXAMPLE B1

A laboratory kneading apparatus with a capacity of 0.75 l is charged with 50 g of amorphous dioxazine violet as per Example A1, 300 g of sodium chloride and 87 ml of dry dimethylformamide and the speed of rotation is adjusted to 80 rpm. The walls of the kneading apparatus are thermostatted at 45° C. After 6 hours, the speed of rotation is reduced to 5 rpm and the temperature is allowed to fall to 20° C., after which 120 ml of deionized water are added slowly, the resulting mixture is discharged onto a Büchner funnel and the solid product is washed with water until the washing water is salt-free. The product is dried at 80° C./3·10³ Pa for 15 hours and sieved through a mesh of size 0.4 mm.

EXAMPLES B2–B16

The procedure of Example B1 is repeated but using as starting material the products of Examples A2–A16.

EXAMPLE C1

A 10 l mixer (FM 10 MB™, Henschel, Germany) is charged with 800 g of Sumitone® Fast Violet RL 4R base and 3200 g of sodium chloride (Spezialsalz 100/95™, average particle size approximately 70 μm, Schweizer Salinen, Schweizerhalle, Switzerland). Cooling is switched on and the rotary speed of the triple propeller (diameter 220 mm) is adjusted to 3200 rpm. After an hour, the internal temperature is 130° C. The temperature is then left to fall to 30° C. at 50 rpm.

The powder is transferred to a laboratory kneading apparatus with a capacity of 10 l (Werner & Pfleiderer, Germany). Then 1600 g of ground sodium chloride (particle size distribution with maximum around 20 μm) and 1400 ml of dimethylformamide are added and the mixture is kneaded at 100 rpm for 8 hours. The walls of the kneading apparatus are thermostatted at 45° C.

The 2000 ml of deionized water are added, the resulting mixture is discharged onto a Buchner funnel and the solid product is washed with water until the washing water is salt-free. The product is dried at 80° C./3·10³ Pa for 15 hours and sieved through a mesh of size 0.8 mm.

EXAMPLE C2

A 10 l mixer (FM 10 MB™, Henschel, Germany) is charged with 900 g of Sumitone® Fast Violet RL 4R base and 3600 g of sodium chloride (Spezialsalz 100/95™, average particle size approximately 70 μm, Schweizer Salinen, Schweizerhalle, Switzerland). Cooling is switched on and the rotary speed of the triple propeller (diameter 220 mm) is adjusted to 3200 rpm. After an hour, the internal temperature is 130° C. The temperature is then left to fall to 30° C. at 50 rpm.

250 g of this powder are transferred to a laboratory kneading apparatus with a capacity of 0.75 l (Werner & Pfleiderer, Germany). Then 100 g of ground sodium chloride (particle size distribution with maximum around 20 μm) and 65 ml of dimethylformamide are added and the mixture is kneaded at 80 rpm for 6 hours. The walls of the kneading apparatus are thermostatted at 40° C.

Then 120 ml of deionized water are added, the resulting mixture is discharged onto a Büchner funnel and the solid product is washed with water until the washing water is salt-free. The product is dried at 80° C./3·10³ Pa for 15 hours and sieved through a mesh of size 0.8 mm.

EXAMPLE C3

A 10 l mixer (FM 10 MB™, Henschel, Germany) is charged with 900 g of Sumitone® Fast Violet RL 4R base and 3600 g of sodium chloride (particle size distribution with a maximum around 20 μm). Cooling is switched on and the rotary speed of the triple propeller (diameter 220 mm) is adjusted to 3200 rpm. After an hour, the internal temperature is 110° C. The temperature is then left to fall to 30° C. at 50 rpm.

250 g of this powder are transferred to a laboratory kneading apparatus with a capacity of 0.75 l (Werner & Pfleiderer, Germany). Then 100 g of ground sodium chloride (particle size distribution with maximum around 20 μm) and 65 ml of dimethylformamide are added and the mixture is kneaded at 86 rpm for 6 hours. The walls of the kneading apparatus are thermostatted at 40° C.

Then 120 ml of deionized water are added, the resulting mixture is discharged onto a Buchner funnel and the solid product is washed with water until the washing water is salt-free. The product is dried at 80° C./3·10³ Pa for 15 hours and sieved through a mesh of size 0.8 mm.

EXAMPLE C4

A 10 l mixer (FM 10 MB™, Henschel, Germany) is charged with 1000 g of Sumitone® Fast Violet RL 4R base and 4000 g of sodium chloride (particle sizes between 5 μm and 700 μm). Cooling is switched on and the rotary speed of the triple propeller (diameter 220 mm) is adjusted to 3200 rpm. After an hour, the internal temperature is 155° C. The temperature is then left to fall to 30° C. at 50 rpm.

250 g of this powder are transferred to a laboratory kneading apparatus with a capacity of 0.75 l (Werner & Pfleiderer, Germany). Then 100 g of ground sodium chloride (particle size distribution with maximum around 20 μm) and 65 ml of dimethylformamide are added and the mixture is kneaded at 80 rpm for 6 hours. The walls of the kneading apparatus are thermostatted at 40° C.

Then 120 ml of deionized water are added, the resulting mixture is discharged onto a Büchner funnel and the solid product is washed with water until the washing water is salt-free. The product is dried at 80° C./3·10³ Pa for 15 hours and sieved through a mesh of size 0.8 mm.

EXAMPLE C5

A 10 l mixer (FM 10 MB™, Henschel, Germany) is charged with 800 g of ®Irgazin Yellow 3RLTN (Pigment Yellow 110) and 3200 g of sodium chloride (Spezialsalz 100/95™, average particle size approximately 70 μm, Schweizer Salinen, Schweizerhalle, Switzerland). Cooling is switched on and the rotary speed of the triple propeller (diameter 220 mm) is adjusted to 3200 rpm. After 40 minutes, the internal temperature is 135° C. The temperature is then left to fall to 30° C. at 50 rpm.

2350 g of this powder are transferred to a laboratory kneading apparatus with a capacity of 5 l (Werner & Pfleiderer, Germany). Then 940 g of ground sodium chloride (particle size distribution with maximum around 20 μm) and 900 ml of diacetone alcohol are added and the mixture is kneaded at 80 rpm for 5 hours. The walls of the kneading apparatus are thermostatted at 45° C.

Then 1000 ml of deionized water are added, the resulting mixture is discharged onto a Buchner funnel and the solid product is washed with water until the washing water is salt-free. The product is dried at 80° C./3·10³ Pa for 15 hours and sieved through a mesh of size 0.8 mm.

EXAMPLE C6

A 10 l mixer (FM 10 MB™, Henschel, Germany) is charged with 600 g of ®Cinquasia Magenta RT-265-D (Pigment Red 202), 200 g ®Irgazin Yellow 3RLTN (Pigment Yellow 110) and 3200 g of sodium chloride (Spezialsalz 100/95™, average particle size approximately 70 μm, Schweizer Salinen, Schweizerhalle, Switzerland). Cooling is switched on and the rotary speed of the triple propeller (diameter 220 mm) is adjusted to 3200 rpm. After 60 minutes, the internal temperature is 130° C. The temperature is then left to fall to 30° C. at 50 rpm.

2000 g of this powder are transferred to a laboratory kneading apparatus with a capacity of 5 l (Werner & Pfleiderer, Germany). Then 800 g of ground sodium chloride (particle size distribution with maximum around 20 μm) and 750 ml of diacetone alcohol are added and the mixture is kneaded at 80 rpm for 5½ hours. The walls of the kneading apparatus are thermostatted at 35° C.

Then 1000 ml of deionized water are added, the resulting mixture is discharged onto a Buchner funnel and the solid product is washed with water until the washing water is salt-free. The product is dried at 80° C./3·10³ Pa for 15 hours and sieved through a mesh of size 0.8 mm.

EXAMPLE C7

A 10 l mixer (FM 10 MB™, Henschel, Germany) is charged with 850 g of ®Cromophthal Blue 4GLP (Pigment Blue 15:3) and 3400 g of sodium chloride (Spezialsalz 100/95™, average particle size approximately 70 μm, Schweizer Salinen, Schweizerhalle, Switzerland). Cooling is switched on and the rotary speed of the triple propeller (diameter 220 mm) is adjusted to 3200 rpm. After one hour, the internal temperature is 130° C. The temperature is then left to fall to 30° C. at 50 rpm.

250 g of this powder are transferred to a laboratory kneading apparatus with a capacity of 0.75 l (Werner & Pfleiderer, Germany). Then 100 g of ground sodium chloride (particle size distribution with maximum around 20 μm) and 88 ml of diacetone alcohol are added and the mixture is kneaded at 80 rpm for 3 hours. The walls of the kneading apparatus are thermostatted at 35° C.

Then 120 ml of deionized water are added, the resulting mixture is discharged onto a Büchner funnel and the solid product is washed with water until the washing water is salt-free. The product is dried at 80° C./3·10³ Pa for 15 hours and sieved through a mesh of size 0.8 mm.

EXAMPLE C8

A 10 l mixer (FM 10 MB™, Henschel, Germany) is charged with 500 g of ®Irgazin DPP Red BO (Pigment Red 254), 500 g ®Cinquasia Magenta RT-265-D (Pigment Red 202), and 4000 g of sodium chloride (particle sizes between 5 μm and 700 μm). Cooling is switched on and the rotary speed of the triple propeller (diameter 220 mm) is adjusted to 3200 rpm. After one hour, the internal temperature is 135° C. The temperature is then left to fall to 30° C. at 50 rpm.

250 g of this powder are transferred to a laboratory kneading apparatus with a capacity of 0.75 l (Werner & Pfleiderer, Germany). Then 100 g of ground sodium chloride (particle size distribution with maximum around 20 μm) and 85 ml of diacetone alcohol are added and the mixture is kneaded at 60 rpm for 6 hours. The walls of the kneading apparatus are thermostatted at 40° C.

Then 120 ml of deionized water are added, the resulting mixture is discharged onto a Buchner funnel and the solid product is washed with water until the washing water is salt-free. The product is dried at 80° C./3·10³ Pa for 15 hours and sieved through a mesh of size 0.8 mm.

EXAMPLE C9

A 10 l mixer (FM 10 MB™, Henschel, Germany) is charged with 1000 g of ®Irgazin DPP Red BO (Pigment Red 254) and 4000 g of sodium chloride (Spezialsalz 100/95™, average particle size approximately 70 μm, Schweizer Salinen, Schweizerhalle, Switzerland). Cooling is switched on and the rotary speed of the triple propeller (diameter 220 mm) is adjusted to 3200 rpm. After one hour, the internal temperature is 130° C. The temperature is then left to fall to 30° C. at 50 rpm.

300 g of this powder are transferred to a laboratory kneading apparatus with a capacity of 0.75 l (Werner & Pfleiderer, Germany). Then 120 g of ground sodium chloride (particle size distribution with maximum around 20 μm) and 90 ml of diacetone alcohol are added and the mixture is kneaded at 100 rpm for 10 hours. The walls of the kneading apparatus are thermostatted at 30° C.

Then 120 ml of deionized water are added, the resulting mixture is discharged onto a Buchner funnel and the solid product is washed with water until the washing water is salt-free. The product is dried at 80° C./3·10³ Pa for 15 hours and sieved through a mesh of size 0.8 mm. The mean particle size is about 70–75 nm.

EXAMPLE C10

Example C9 is repeated, with the difference that Pigment Red 254 prepared according to example 6 of U.S. Pat. No. 4,579,949 (particle size about 0.2–0.5 μm) is substituted for ®Irgazin DPP Red BO. The results are similar.

EXAMPLE C11

A 10 l mixer (FM 10 MB™, Henschel, Germany) is charged with 1000 g of ®Irgazin DPP Red BO (Pigment Red 254) and 4000 g of sodium chloride (Spezialsalz 100/95™, average particle size approximately 70 μm, Schweizer Salinen, Schweizerhalle, Switzerland). Cooling is switched on and the rotary speed of the triple propeller (diameter 220 mm) is adjusted to 3200 rpm. After one hour, the internal temperature is 130° C. The temperature is then left to fall to 30° C. at 50 rpm.

300 g of this powder are transferred to a laboratory kneading apparatus with a capacity of 0.75 l (Werner & Pfleiderer, Germany). Then 90 g of ground sodium chloride (particle size distribution with maximum around 20 $\mu$m) and 75 ml of diacetone alcohol are added and the mixture is kneaded at 100 rpm for 6 hours. The walls of the kneading apparatus are thermostatted at 35° C.

Then 120 ml of deionized water are added, the resulting mixture is discharged onto a Büchner funnel and the solid product is washed with water until the washing water is salt-free. The product is dried at 80° C./3·10$^3$ Pa for 15 hours and sieved through a mesh of size 0.8 mm.

EXAMPLE C12

A 920 l rapid mixer (type RD900/Diosna) is charged with 60 kg of ®Irgazin DPP Red BO (Pigment Red 254) and 360 kg of sodium chloride (Spezialsalz 100/95™, average particle size approximately 70 $\mu$m, Schweizer Salinen, Schweizerhalle, Switzerland). Cooling is switched on and the rotary speed of the spindle (6 knifes of diameter 800 mm) is adjusted to about 750 rpm (the most suitable range is from 700 to 1000 rpm). After 3½ hours, the mixture is discharged from the mixer and cooled down to room temperature.

2500 kg of this powder (collected from several runs) are transferred to a twin-arms kneading apparatus with a capacity of 3000 l (type DMK/De Dietrich). Then 460 l of diacetone alcohol are added and the mixture is kneaded for about 18 hours (about 1500 rpm). The walls of the kneading apparatus are cooled to 5–10° C. in order to control the temperature of the mass to about 30–40° C.

After addition of water, the resulting mixture is discharged onto a filter and the solid product is washed with water until the filtrate is salt-free. The product is dried at 80° C./3·10$^3$ Pa for 15 hours and sieved through a mesh of size 0.8 mm. FIG. 1 is a TEM picture of this product.

EXAMPLE C13

A 10 l mixer (FM 10 MB™, Henschel, Germany) is charged with 1000 g of ®Cromophtal Yellow 3G (Pigment Yellow 93) and 4000 g of sodium chloride (Spezialsalz 100/95™, average particle size approximately 70 $\mu$m, Schweizer Salinen, Schweizerhalle, Switzerland). Cooling is switched on and the rotary speed of the triple propeller (diameter 220 mm) is adjusted to 3200 rpm. After one hour, the internal temperature is 130° C. The temperature is then left to fall to 30° C. at 50 rpm.

250 g of this powder are transferred to a laboratory kneading apparatus with a capacity of 0.75 l (Werner & Pfleiderer, Germany). Then 100 g of ground sodium chloride (particle size distribution with maximum around 20 $\mu$m) and 110 ml of diacetone alcohol are added and the mixture is kneaded at 80 rpm for 6 hours. The walls of the kneading apparatus are thermostatted at 40° C.

Then 120 ml of deionized water are added, the resulting mixture is discharged onto a Buchner funnel and the solid product is washed with water until the washing water is salt-free. The product is dried at 80° C./3·10$^3$ Pa for 15 hours and sieved through a mesh of size 0.8 mm.

EXAMPLES C14–C26

Examples C1–C13 are repeated with the sole difference that, based on the pigment weight, 10% of a solid, acetone-soluble resin are added. The results are likewise excellent.

EXAMPLE C27

Pigment Red 254 is prepared according to example 1 of U.S. Pat. No. 4,931,566. A very fine-sized pigment of particle size <0.2 $\mu$m is obtained.

EXAMPLE C28

A laboratory kneading apparatus with a capacity of 0.75 l (Werner & Pfleiderer, Germany) is charged with 300 g of fine-sized Pigment Red 254 prepared according to example C27 and 1200 g of ground sodium chloride (particle size distribution with maximum around 20 $\mu$m). 90 ml of diacetone alcohol are added and the mixture is kneaded at 100 rpm for 10 hours. The walls of the kneading apparatus are thermostatted at 30° C.

Then 120 ml of deionized water are added, the resulting mixture is discharged onto a Buchner funnel and the solid product is washed with water until the washing water is salt-free.

The product is dried at 80° C./3·10$^3$ Pa for 15 hours and sieved through a mesh of size 0.8 mm.

The product obtained has a particle size of 0.06–0.10 $\mu$m and a relatively pure hue, but its crystallinity is inferior to that of Example C10.

EXAMPLE C29

Example C28 is repeated, with the difference that ®Irgazin DPP Red BO (coarse particles, specific surface area ~15 g/m$^2$) is substituted for the fine-sized product according to example C27, and that sodium chloride of particle size distribution with maximum around 50 $\mu$m is used.

EXAMPLE D1

210 g of SCX-8082™ (containing 30.0% dispersing polymer Joncryl® 690, 2.15% ammonia and 67.85% water, 29.5% solids content, S.C. Johnson Polymer) and 90 g of the product of Example C1 are predispersed in a laboratory dissolver (Dispermat CV™; Hediger), at 6000 rpm for 15 minutes. The suspension is then transferred to a 125 ml bead mill with dissolver attachment (Dispermat SL™; Hediger) charged with 207 g of zirconium mixed-oxide beads of diameter 1.0 to 1.2 mm (Hermann Oeckel Ingenieur GmbH, D-95100 Selb, Germany). The batch is then dispersed at 4000 rpm for 10 minutes, the pump output being set at 60%, corresponding to a time of 30 s for the first pass, and the temperature, despite cooling, rises from 23° C. to 38° C.

A ready-to-use printing ink is obtained by diluting this concentrate with a solution of 2565 g of Zinpol® 1519 (40% strength all-acrylate solution in water/isopropanol, viscosity 2500–4000 mPa·s, Worlee-Chemie GmbH, D-21472 Lauenburg, Germany) in 2280 g of water and 855 g of isopropanol in a laboratory dissolver at 6000 rpm and 23° C. for 15 minutes. Printing is carried out with this printing ink and a commercial gravure printing machine (Rotova™, Rotocolor AG) onto standard HIFI kraft paper (Zanders™ Mega Web 135 gr No. 585585, Sihl & Eika Papier Ag, CH-8800 Thalwil, Switzerland), the solids content after drying being 0.860 g/m$^2$. The result is a very brilliant and transparent, violet print with excellent colour strength.

EXAMPLES D2–D17

The procedure of Example D1 is repeated using as starting material the products of Examples B1–B16. The results are comparable, colouristics, with L* values of from 46 to 47.5, C* values of from 53 to 55 and h value 308, measured on an X-RITE SP68™ reflection spectrometer ($D_{10^*}{}^{65}$, 400–700 nm).

EXAMPLE D18

Comparative

The procedure of Example D1 is repeated but using as starting material the product Hostaperm® Violet RL Special (Clariant), which is known for particularly good colour strength and saturation. The result is a violet print with the following colour coordinates, measured on an X-RITE SP68™ reflection spectrometer ($D_{10*}^{65}$, 400–700 nm): L*=48, C*=52, h*=307.

EXAMPLES E1–E5

The crystallinity of the products according to examples C10, C12, C27 and C28 as well as commercially available ®Irgaphor DPP Red B-CF (mean particle size ~50 nm; Ciba Specialty Chemicals Inc.) is compared using a Rigaku RAD2C X-ray diffractometer ($CuK_\alpha$, 40 kV, 40 mA). The pigments are filled up in a standard aluminium sample holder. The divergence (DS) and scattering (SS) slits are adjusted to 0.5°, the receiving slit (RS) to 0.15 mm. The diffracted x-ray beam is monochromatised and measured by a scintillation counter. 2θ-θ scanning is done with the fixed time method (τ=2 s with a step of 0.02°) to minimize the effect of x-ray statistic fluctuation. The corrected data are processed with smoothing and background substraction using the Savitzky-Golay and Sonnveld-Visser methods, respectively.

The peak width at half the intensity of the peak maximum is measured for the main peak at about 28 °2θ. The results are as follows:

| example | pigment | full width at half maximum (~28 [° 2θ]) | count/s |
| --- | --- | --- | --- |
| E1 | according to C10 | 0.612 | 757 |
| E2 | according to C12 | 0.423 | 1028 |
| E3 | according to C27 | 0.826 | 1006 |
| E4 | according to C28 | 0.894 | 721 |
| E5 | ® Irgaphor DPP Red B-CF | 0.795 | 1093 |

The precision depends both on the peak width and on the number of counts at the maximum, which itself depends on the peak width, too. Thus, broader full widths at half maximum (in this case above 0.70) are less precise.

Figure 2:
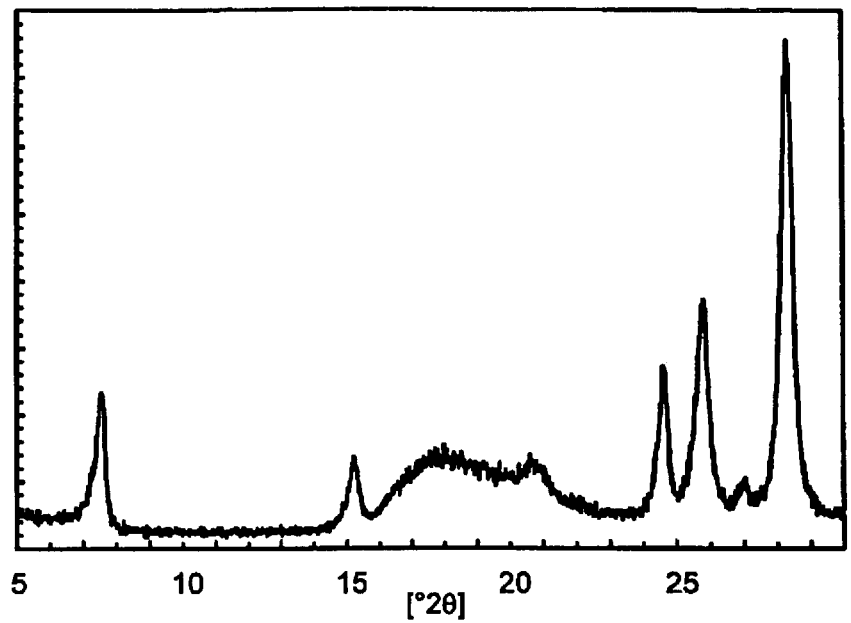
FIG. 2 shows the X-ray diffraction spectrum of a product obtained in very close analogy to Examples C12 and E2.

FIG. 2 shows the X-ray diffraction spectrum of a product obtained in very close analogy to examples C12 and E2.

Figure 3:
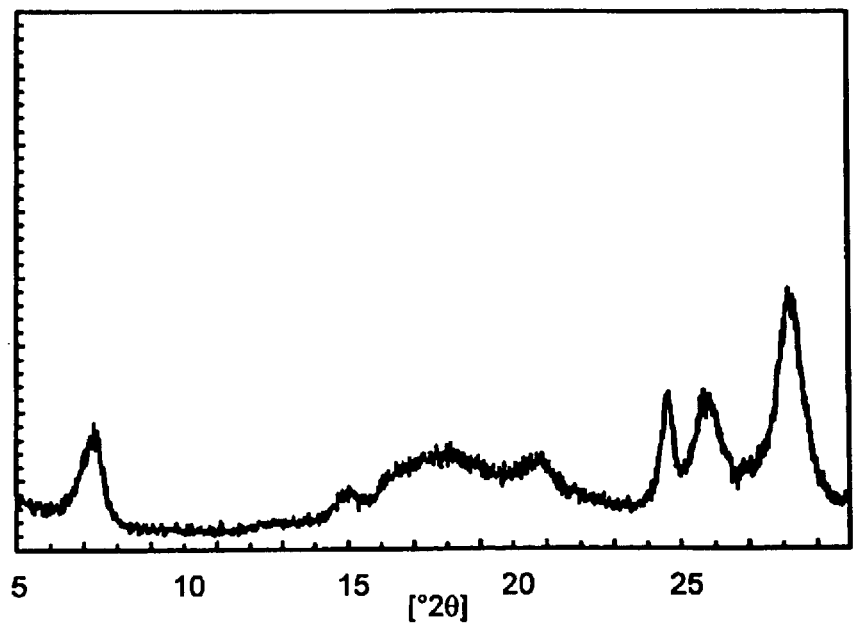
FIG. 3 shows the X-ray diffraction spectrum of a product obtained in very close analogy to Examples C28 and E4.

FIG. 3 shows the X-ray diffraction spectrum of a product obtained in very close analogy to examples C28 and E4.

EXAMPLES F1–F5

The following substances are introduced into a 37 ml screw bottle: 200 mg of the products according to examples C10, C12, C27 and C28 as well as commercially available ®Irgaphor DPP Red B-CF; 8 mg Solsperse S22000 (Zeneca); 32 mg Solsperse S24000 (Zeneca); 200 mg of a copolymer of aromatic methacrylates with methacrylic acid of $M_w$ from 30'000 to 60'000; 1760 mg (1-methoxy-2-propyl)-acetate and 5000 mg zirconia beads of diameter 0.5 mm. The bottle is sealed with an inner cup then applied to a paint conditioner for 3 hours to give a dispersion.

The dispersion thus obtained is cast onto a glass substrate by means of spin coating, wherein a rotation speed is adjusted to give a film having color coordination x=0.5500 (standard C light, viewing angle 2°), then dried at 60° C. for 1 hour. The optical properties of the dispersion films thus obtained are measured by use of a UV/VIS spectrophotometer. The results are as follows:

| example | pigment | absorption maximum (VIS) | film thickness |
| --- | --- | --- | --- |
| F1 | according to C10 | 558 nm | 0.62 μm |
| F2 | according to C12 | 560 nm | 0.62 μm |
| F3 | according to C27 | 554 nm | 0.62 μm |
| F4 | according to C28 | 557 nm | 0.62 μm |
| F5 | ® Irgaphor DPP Red B-CF | 553 nm | 0.62 μm |

FIG. 4 shows the absorption spectra from 350 to 770 nm of the colour filters according to examples F2 and F3. The maximum slope (decrease in absorption) in the region from 570 to 580 nm is 6.16% A/nm around 579 nm for example F2 and 4.39% A nm around 575 nm for example F3.

EXAMPLE G1

The dispersion film according to example F2 is heated to 270° C. for 60 minutes in an oven at the air. Optical microscope images of the films are taken after heat treatment. The heat stability is much better than that of other pigment dispersions suitable for red color filter applications.

EXAMPLE H1

15 g of pigment and 15 g lithium stearate (metal soap, any kinds) are mixed by homogenizer at 3000 rpm for 3 minutes. 1.2 g of this dry mixture and 600 g of PET-G pellet (pigment concentration: 0.1%) are tumbled by 2-roll for 15 minutes in a glass bottle. The obtained composition is then injection moulded to platelets at 260° C. for 5 minutes. The CIE 1976 colour coordinates are: L*=58.1 C*=35.3 h=3.7. The heat stability is high.

What is claimed is:

1. A substantially crystalline organic pigment selected from the group consisting of quinacridone, anthraquinone, perylene, indigo, quinophthalone, indanthrone, isoindolinone, isoindoline, dioxazine, azo, phthalocyanine and diketopyrrolopyrrole pigments consisting of particles of average size from 0.01 μm to 0.12 μm, wherein the total quantity of particles of size greater than 0.12 μm and smaller than 0.01 μm is from 0 to 8% by weight, based on the weight of particles of size from 0.01 μm to 0.1 μm, and full width at half maximum of a $CuK_\alpha$ radiation X-ray powder diagram is from 0 to 0.68 °2θ.

2. A pigment according to claim 1, which is a quinacridone pigment.

3. A pigment according to claim 1, which is an anthraquinone pigment.

4. A pigment according to claim 1, which is a perylene pigment.

5. A pigment according to claim 1, which is an indigo pigment.

6. A pigment according to claim 1, which is a quinophthalone pigment.

7. A pigment according to claim 1, which is an indanthrone pigment.

8. A pigment according to claim 1, which is an isoindolinone pigment.

9. A pigment according to claim 1, which is an isoindoline pigment.

10. A pigment according to claim 1, which is a dioxazine pigment.

11. A pigment according to claim 1, which is an azo pigment.

12. A pigment according to claim 1, which is a 1,4-diketopyrrolo[3,4c]-pyrrole pigment.

13. A pigment according to claim 12, which is a 1,4-diketopyrrolo[3,4c]-pyrrole pigment of the formula

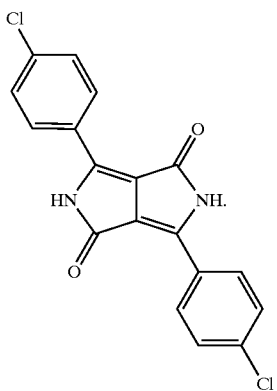

(II)

14. An organic pigment according to claim 13, wherein the particles are of average size from 0.02 μm to 0.10 μm, the total quantity of particles of size greater than 0.12 μm and smaller than 0.01 μm is from 0 to 4% by weight, based on the weight of particles of size from 0.01 μm to 0.1 μm, and the full width at half maximum of an X-ray powder diagram is from 0.1 to 0.6 °2θ.

15. An organic pigment according to claim 13, wherein the particles are of average size from 0.03 μm to 0.06 μm, the total quantity of particles of size greater than 0.12 μm and smaller than 0.01 μm is from 0 to 2% by weight, based on the weight of particles of size from 0.01 μm to 0.1 μm, and the full width at half maximum of an X-ray powder diagram is from 0.2 to 0.5 °2θ.

16. An organic pigment according to claim 1, wherein the particles are of average size from 0.02 μm to 0.10 μm, the total quantity of particles of size greater than 0.12 μm and smaller than 0.01 μm is from 0 to 4% by weight, based on the weight of particles of size from 0.01 μm to 0.1 μm, and the full width at half maximum of an X-ray powder diagram is from 0.1 to 0.6 °2θ.

17. A pigment according to claim 16, which is a quinacridone pigment.

18. A pigment according to claim 16, which is an anthraquinone pigment.

19. A pigment according to claim 16, which is a perylene pigment.

20. A pigment according to claim 16, which is an indigo pigment.

21. A pigment according to claim 16, which is a quinophthalone pigment.

22. A pigment according to claim 16, which is an indanthrone pigment.

23. A pigment according to claim 16, which is an isoindolinone pigment.

24. A pigment according to claim 16, which is an isoindoline pigment.

25. A pigment according to claim 16, which is a dioxazine pigment.

26. A pigment according to claim 16, which is an azo pigment.

27. A pigment according to claim 16, which is a 1,4-diketopyrrolo[3,4c]-pyrrole pigment.

28. An organic pigment according to claim 1, wherein the particles are of average size from 0.03 μm to 0.06 μm, the total quantity of particles of size greater than 0.12 μm and smaller than 0.01 μm is from 0 to 2% by weight, based on the weight of particles of size from 0.01 μm to 0.1 μm, and the full width at half maximum of an X-ray powder diagram is from 0.2 to 0.5 °2θ.

29. A pigment according to claim 28, which is a quinacridone pigment.

30. A pigment according to claim 28, which is an anthraquinone pigment.

31. A pigment according to claim 28, which is a perylene pigment.

32. A pigment according to claim 28, which is an indigo pigment.

33. A pigment according to claim 28, which is a quinophthalone pigment.

34. A pigment according to claim 28, which is an indanthrone pigment.

35. A pigment according to claim 28, which is an isoindolinone pigment.

36. A pigment according to claim 28, which is an isoindoline pigment.

37. A pigment according to claim 28, which is a dioxazine pigment.

38. A pigment according to claim 28, which is an azo pigment.

39. A pigment according to claim 28, which is a 1,4-diketopyrrolo[3,4c]-pyrrole pigment.

* * * * *